US011876615B2

(12) United States Patent
Madden, III et al.

(10) Patent No.: US 11,876,615 B2
(45) Date of Patent: Jan. 16, 2024

(54) LOCATION-BASED CONTENT SHARING VIA TETHERING

(71) Applicant: NantG Mobile, LLC, Culver City, CA (US)

(72) Inventors: Michael E. Madden, III, San Diego, CA (US); Jesse William Snyder, San Diego, CA (US); Jake Tyler Fyfe, Los Angeles, CA (US); John Wiacek, Los Angeles, CA (US); Matthew W. Geer, Escondido, CA (US)

(73) Assignee: NantG Mobile, LLC, Culver City, CA (US)

( * ) Notice: Subject to any disclaimer, the term of this patent is extended or adjusted under 35 U.S.C. 154(b) by 0 days.

(21) Appl. No.: 17/313,851

(22) Filed: May 6, 2021

(65) Prior Publication Data

US 2021/0352131 A1 Nov. 11, 2021

Related U.S. Application Data

(60) Provisional application No. 63/021,282, filed on May 7, 2020.

(51) Int. Cl.
*H04L 67/04* (2022.01)
*H04W 12/64* (2021.01)
*H04L 67/104* (2022.01)

(52) U.S. Cl.
CPC ............ *H04L 67/04* (2013.01); *H04L 67/104* (2013.01); *H04W 12/64* (2021.01)

(58) Field of Classification Search
CPC ....... H04L 67/04; H04L 67/104; H04W 12/64
See application file for complete search history.

(56) References Cited

U.S. PATENT DOCUMENTS

| 8,681,178 B1 * | 3/2014 | Tseng .................... G06T 19/006 345/629 |
| 10,078,873 B2 | 9/2018 | Boccon-Gibod et al. |

(Continued)

FOREIGN PATENT DOCUMENTS

WO 2012128497 A2 9/2012

OTHER PUBLICATIONS

International Search Report from corresponding PCT Application No. PCT/US2021/031099 dated Aug. 11, 2021.

(Continued)

*Primary Examiner* — Joseph L Greene
(74) *Attorney, Agent, or Firm* — Harness Dickey & Pierce P.L.C.

(57) ABSTRACT

A method for sharing digital content includes determining whether a first computing device is physically located within a defined geographical area, if the first computing device is physically located within the defined geographical area, providing access of shareable digital content to the first computing device, instantiating a tethering object associated with the shareable digital content, the tethering object including at least a first endpoint at the first computing device and a second endpoint at a second computing device remote from the first computing device, and providing access of at least a portion of the shareable digital content, via the tethering object, to the second endpoint at the second computing device remote from the first computing device. Other example methods and computer systems for implementing content sharing methods are also disclosed.

16 Claims, 8 Drawing Sheets

(56) References Cited

U.S. PATENT DOCUMENTS

| | | | |
|---|---|---|---|
| 10,099,123 B2 | 10/2018 | Berner et al. | |
| 10,140,317 B2 | 11/2018 | McKinnon et al. | |
| 10,143,023 B2 | 11/2018 | Hassan et al. | |
| 2009/0031006 A1* | 1/2009 | Johnson | H04W 4/14 709/218 |
| 2011/0314121 A1* | 12/2011 | Navda | H04L 67/2842 709/217 |
| 2013/0151684 A1 | 6/2013 | Forsman et al. | |
| 2014/0066014 A1* | 3/2014 | Nicholson | H04W 12/088 455/411 |
| 2014/0129630 A1* | 5/2014 | Nikain | H04N 21/4756 709/204 |
| 2017/0243403 A1* | 8/2017 | Daniels | G06T 19/20 |
| 2018/0350144 A1* | 12/2018 | Rathod | H04W 4/021 |
| 2018/0352166 A1* | 12/2018 | Silic | H04N 23/66 |
| 2019/0057113 A1 | 2/2019 | McKinnon et al. | |
| 2019/0102997 A1 | 4/2019 | Kelly et al. | |
| 2019/0342249 A1* | 11/2019 | Holmes | G06Q 30/02 |
| 2020/0092389 A1* | 3/2020 | Conolly | H04W 4/23 |
| 2020/0117687 A1* | 4/2020 | Parulski | G06Q 50/14 |
| 2021/0343058 A1* | 11/2021 | Yang | G10H 1/368 |

OTHER PUBLICATIONS

Written Opinion from corresponding PCT Application No. PCT/US2021/031099 dated Aug. 11, 2021.

* cited by examiner

LOCATION-BASED CONTENT SHARING VIA TETHERING

CROSS-REFERENCE TO RELATED APPLICATIONS

This application claims the benefit of U.S. Provisional Application No. 63/021,282 filed May 7, 2020. The entire disclosure of the above application is incorporated herein by reference.

FIELD

The present disclosure relates to location-based content sharing via tethering.

BACKGROUND

This section provides background information related to the present disclosure which is not necessarily prior art.

Various computing devices may be communicatively coupled together via a tethered connection. In some examples, the tethered connection between the computing devices may be established with a wired connection (e.g., such as a USB cable) or a wireless connection. When the computing devices are tethered via a wireless connection, software on the computing devices may allow one of the computing devices (e.g., a cell phone) to operate as a hotspot (e.g., a modem) for the other connected computing devices (e.g., a laptop). Typically, the wireless tethered connection require the connected computing devices to be located (physically) in the same geolocation to ensure a solid wireless connection (e.g., 802.11) is established and maintained.

SUMMARY

This section provides a general summary of the disclosure, and is not a comprehensive disclosure of its full scope or all of its features.

According to one aspect of the present disclosure, a system for sharing digital content is presented. The system includes one or more computer digital content servers, a first computing device in communication with the one or more computer digital content servers, and a second computing device in communication with the first computing device and/or the one or more computer digital content servers. The second computing device being remote from the first computing device. The one or more computer digital content servers are configured to determine whether the first computing device is physically located within a defined geographical area based on location sensor data, and if the first computing device is physically located within the defined geographical area, provide access of shareable digital content to the first computing device. The first computing device, the second computing device, and/or the one or more computer digital content servers are configured to instantiate a tethering object associated with the shareable digital content. The tethering object includes a first endpoint at the first computing device and a second endpoint at the second computing device. The second computing device is configured to receive at least a portion of the shareable digital content, via the tethering object, at the second endpoint.

According to another aspect of the present disclosure, a computer-implemented method executed by one or more computer digital content servers for sharing digital content is disclosed. The method includes determining whether a first computing device is physically located within a defined geographical area or proximate to a geographic location based on location sensor data, if the first computing device is physically located within or proximate to the defined geographical area, providing access of shareable digital content to the first computing device, and instantiating a tethering object associated with the shareable digital content. The tethering object includes at least a first endpoint at the first computing device and a second endpoint at a second computing device remote from the first computing device. The method further includes providing access of at least a portion of the shareable digital content, via the tethering object, to the second endpoint at the second computing device remote from the first computing device.

According to yet another aspect of the present disclosure, a non-transitory computer readable medium including computer-executable instructions is disclosed. The computer-executable instructions are executable by a processor to determine whether a first computing device is physically located within a defined geographical area or proximate to a geographic location based on location sensor data, if the first computing device is physically located within the defined geographical area, provide access of shareable digital content to the first computing device, and instantiate a tethering object associated with the shareable digital content. The tethering object includes at least a first endpoint at the first computing device and a second endpoint at a second computing device remote from the first computing device. The computer-executable instructions are further executable by a processor to provide access of at least a portion of the shareable digital content, via the tethering object, to the second endpoint at the second computing device remote from the first computing device.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding (but not necessarily identical) parts and/or features throughout the several views of the drawings.

DETAILED DESCRIPTION

Figure 1:
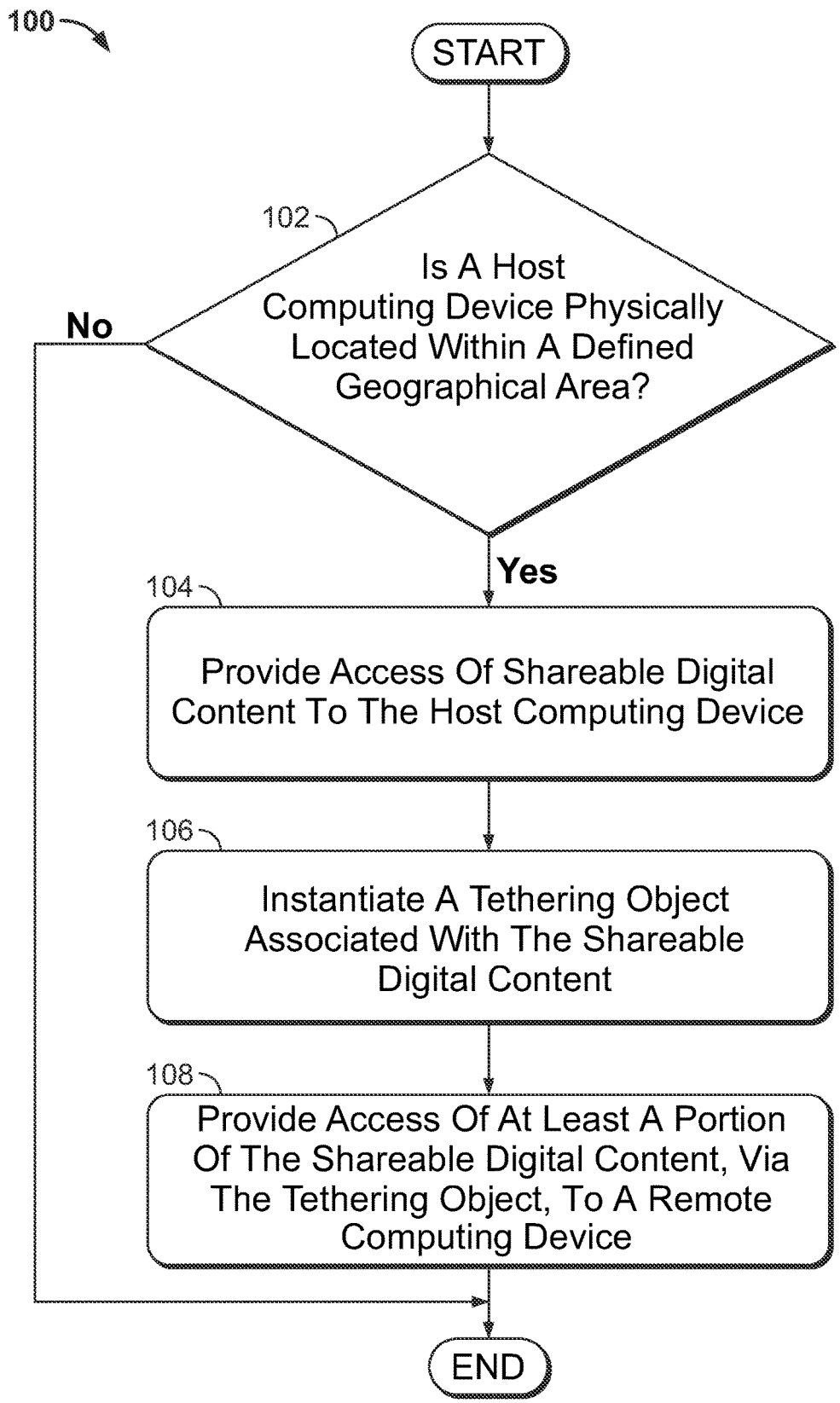
FIG. 1 is a block diagram of a computer-implemented method for sharing location-based digital content according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A computer-implemented method for sharing digital content among multiple computing devices according to one example embodiment of the present disclosure is illustrated in FIG. 1, and indicated generally by reference number 100. The computer-implemented method 100 begins by determining whether a host computing device is physically located within a defined geographical area or proximate to a geographic location at block 102. If no at block 102, the method ends. In other examples, the method 100 may return to block 102 (e.g., after a delay) if desired. If yes at block 102, the method 100 proceeds to block 104 to provide access of shareable digital content to the host computing device if the host computing device is physically located within or proximate to the defined geographical area. The method 100 further includes instantiating a tethering object associated with the shareable digital content at block 106, and providing access of at least a portion of the shareable digital content, via the tethering object, to a remote computing device at block 108.

In such examples, the remote computing device may obtain access to a portion (or all) of the digital content being engaged by the host computing device even though the remote computing device may be located outside the geographical area or distal to the geographic location. For example, the digital content may be bound to the geographical area or location, and a computing device (e.g., the host computing device) may access the content only when the computing device is within the geographical area. In such examples, once the host computing device is within the geographical area, the tethering object may be established thereby allowing the remote computing device located outside the geographical area to access a portion (or all) of the location-based digital content. As such, the host computing device may operate as a proxy for content delivery to the remote computing device.

As explained above, the digital content is shared via a tethering object. In such examples, the tethering object comprises a communication channel between multiple computing devices. In some examples, multiple tethering objects may be created between various computing devices. For example, one or more tethering objects may be created between the host computing device and the remote computing device, between the host computing device and other remote computing devices, between the host computing device and one or more computer servers, between the remote computing device and one or more computer servers, etc. In such examples, the tethering object could represent a direct communication between the host computing device and the remote computing device, and/or an indirect communication between the host computing device and the remote computing device via the computer server(s). For example, the tethering object may comprise one or more TCP/IP, UDP/IP, HTTP, HTTPS, or other network protocol connections between or among devices. Such network connections can comprise direct peer to peer connections or connections through intermediary devices (e.g., servers, hubs, clouds services, etc.).

Each tethering object may further comprise one or more software objects (e.g., software applications) stored in non-transitory computer readable memory of one or more of the computing devices. For example, each tethering object may include executable software instructions and corresponding data structures. In such examples, each tethering object or portions thereof can be instantiated in non-transitory computer readable memory of any of the computing devices in a system such as the host computing device, the remote computing device, the computer server(s), etc. Thus, one or more tethering objects can be from a tethering class object that includes data members, methods, or other object oriented features.

Each tethering object may also include two or more endpoints for establishing the commutation channel between or among the computing devices. For example, if a tethering object is established between the host computing device and the remote computing device, the tethering object may include an endpoint at the host computing device and another endpoint at the remote computing device. In this example, the access to the digital content is provided through the endpoints at the computing devices. One should appreciate that such a tethering object provides technical advantages because a single tethering object allows for management of communication endpoints collectively with location-based or location-bound content.

In some examples, the tethering objects can be instantiated based on different tether classes. For example, the host computing device may instantiate a host tethering object that manages the host computing device's responsibilities with respect to the communication channel, the remote computing device may instantiate a remote tethering object that manages the remote computing device's responsibilities, the computer server(s) may instantiate a sever tethering object that coordinates among associated the host and/or remote tethering objects, etc.

The digital content may be bound to the defined geographical area, a geographic location, or other location-based feature. For example, the digital content bound to the defined geographical area may be identified by, for example, the computer server(s), the host computing device, the remote computing device, etc. In such examples, the digital content may be accessed by the host computing device only if the host computing device is physically located (e.g., the real world location) within the defined geographical area or proximate to a corresponding location. One should appreciate that a geographic area could be considered a location when that area is sufficiently small while accounting for error in the location sensor data.

The host computing device may be determined to be physically located within the defined geographical area by using one or more sensors. For example, the host computing device may include one or more sensors. In such examples, determining whether the host computing device is physically located within the defined geographical area may be based on data provided by the host computing device's sensor(s) (e.g., sensor(s) onboard the computing device, GPS, SLAM, vSLAM, IMU, etc.). Additionally and/or alternatively, one or more sensors external to the host computing device may be used to determine whether the host computing device is physically located within the defined geographical area. For example, one or more sensors may be positioned in and/or around the defined geographical area for tracking, observing, identifying, etc. the host computing device (and/or other computing devices).

In some examples, access to the digital content is provided when the tethering object is instantiated. For example, the host computing device may have access to the digital content only after the tethering object is instantiated and while it is within the defined geographical area. In such examples, the host computing device and the remote computing device may obtain access to the digital content at about the same time. In other examples, the host computing device obtains access to the digital content after entering the defined geographical area. In such examples, the host computing device may obtain access to the digital content before the tethering object is instantiated (and therefore before the remote computing device obtains access to the digital content).

Access to the digital content may be provided in different manners. For example, the computer server(s) may transmit the digital content (or portions thereof) to the host computing device and/or the remote computing device. In some examples, the digital content may be transmitted via one or more established tethering objects (e.g., from one endpoint to another endpoint), as explained herein. In other examples, some or all of the digital content may be stored on the host computing device (e.g., stored in the host computing device's non-transitory computer readable memory) and/or the remote computing device (e.g., stored in the remote computing device's non-transitory computer readable memory). For example, the stored digital content (or portions thereof) may be accessible and provided to the tethering object's endpoint at the computing device when one or more conditions are met (e.g., the host computing device is within the defined geographical area, the tethering object is established, etc.). In such examples, the stored digital content may be unlocked, decrypted, etc. when one or more conditions are met. In such examples, the shareable digital content may be transmitted, stored, etc. as, for example, binary files, JSON data, XML data, and/or other suitable data formats amenable for transmission over a network (e.g., cell network, packet switch network, etc.).

Figure 2:
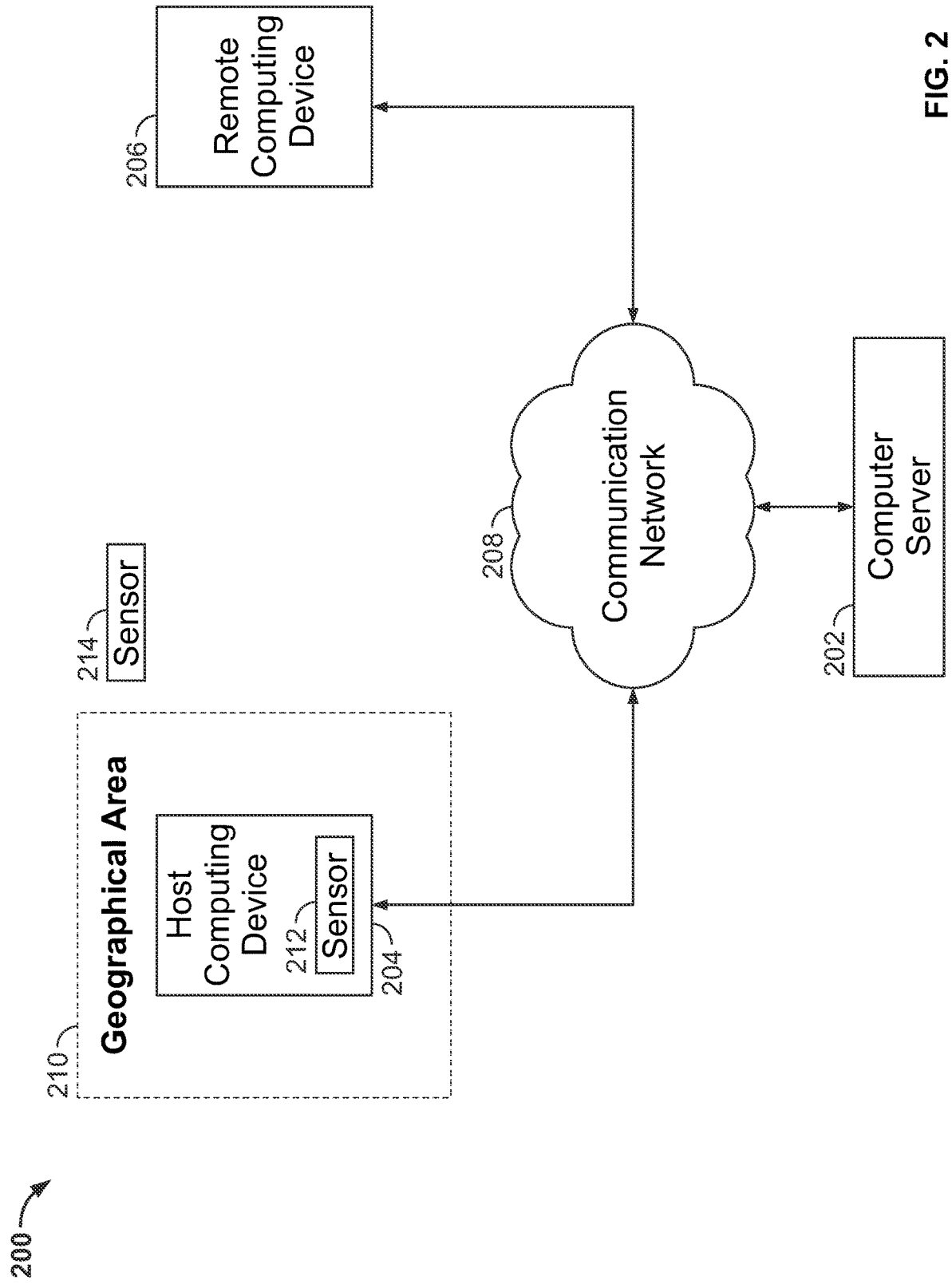
FIG. 2 is a block diagram of a system including a host computing device and a remote computing device forming a tethering connection for sharing location-based digital content according to another example embodiment.

The computer-implemented methods disclosed herein may be implemented by any suitable system including any one of the systems disclosed herein. For example, FIG. 2 illustrates a system 200 including a computer digital content server 202, a host computing device 204 (e.g., a cell phone, a smart phone, a tablet, a game console, etc.), and a remote computing device 206 (e.g., a smart phone, a tablet, a game console, a computer, etc.). In the example of FIG. 2, the remote computing device 206 is remote from the host computing device 204. As shown, the computing devices 204, 206 and the computer server 202 are in communication with each other via, for example, a communication network 208. Although only one computer server 202 is shown, it should be apparent that the system 200 may include more than one computer server if desired.

In the example of FIG. 2, the computer digital content server 202 or another similarly capable device determines whether the host computing device 204 is physically located within a defined geographical area 210 based on location sensor data, as explained above. If the host computing device 204 is located within the defined geographical area 210, the computer server 202 provides access of digital content to the host computing device 204. As explained above, this content may be bound to the defined geographical area 210. For example, the digital content can be stored in a database or another addressing system capable of accessing digital content via location information. The database could be configured to store relevant digital content based on an S2 cell ID, latitude—longitude pair, a Google Plus Code, or other location information. The server 202 can retrieve the digital content by submitting the location information to the database, which in turn can respond with a result set comprising the digital content or links to the digital content.

The computer digital content server 202 may receive data to determine whether the host computing device 204 is within the defined geographical area 210, as explained above. For example, the host computing device 204 may determine its physical location based on data from its optional onboard sensor 212, and then transmit its physical location to the computer server 202 to determine whether the device 204 is within the defined geographical area 210. In other embodiments, the computer server 202 may determine the physical location of the host computing device 204 (and whether it is within the defined geographical area 210) based on data received from the sensor 212, data received from another optional sensor 214 external to the device 204 and near the defined geographical area 210, etc. as explained above.

Any one of the computing devices may instantiate a tethering object associated with the digital content. For example, the computer server 202, the host computing device 204 and/or the remote computing device 206 may instantiate the tethering object. For instance, the tethering object may include one endpoint at the host computing device 204 and another endpoint at the remote computing device 206.

The remote computing device 206 receives at least a portion of the digital content, via the tethering object, at its endpoint. For example, the host computing device 204 may receive at least a portion of the digital content when it is located within the defined geographical area 210, and then transmit the received digital content (or portions thereof), via the tethering object, to the endpoint of the remote computing device 206. In other examples, the computer server 202 may transmit the digital content (or portions thereof), via the tethering object, to the endpoint of the remote computing device 206. In still other examples, the digital content (or portions thereof) may be stored on the remote computing device 206, and the remote computing device 206 may receive the digital content (at its endpoint) by accessing the stored content, as explained above.

In some examples, any one of the computing devices (including the computer server 202) may send a tethering request to begin the tethering process. For example, the host computing device 204 may send a tethering request to the remote computing device 206, the computer server 202, and/or another computing device in the system 200. Additionally and/or alternatively, the remote computing device 206 may send a tethering request to the host computing device 204, the computer server 202, and/or another computing device in the system 200. In other examples, the computer server 202 may send a tethering request to one or both computing devices 204, 206, and/or another computing device in the system 200.

The remote computing device 206 may be required to meet one or more conditions before it receives the digital content (or portions thereof). In some examples, the remote computing device 206 may receive the digital content (or portions thereof) only if a virtual location and/or a physical location of the remote computing device 206 is within the defined geographical area 210. For example, when the tethering object is established, the remote computing device 206 may have a virtual presence of being within the defined geographical area 210 with the host computing device 204. In such examples, the remote computing device 206 may receive the digital content because a remote user of the remote computing device 206 is virtually located within the defined geographical area 210. In other examples, the remote computing device 206 may be required to be physically located within a certain distance from the host computing device 204.

The geographical area 210 and/or any other geographical area disclosed herein may be defined by various different factors. For example, and as further explained below, the geographical area may be defined by a set of coordinates that form a geo-fenced area around a particular landmark. In some examples, the geographical area may be an absolute (e.g. fixed) geographical area. In other examples, the geographical area may be a relative geographical area that may change (e.g., change shape, radius, location, etc.) over time based on a particular host computing device, a location of a particular host computing device and/or the computing devices involved, the number of computing devices involved, etc. For example, the geographical area 210 may be a fixed geo-fenced area as shown in FIG. 2, a relative geo-fence (e.g., a halo) that moves and remains centered on the host computing device 204, etc.

In the example of FIG. 2, the computer digital content server 202 may operate as a hub for communications between the computing devices 204, 206. In other examples where multiple remote computing devices and/or multiple host computing devices are involved with a tethering event, a hub-spoke networking topology may be implemented. Optionally, one more other tethering topologies may also be implemented including, for example, a star topology, a many-to-many topology, a ring topology, a mesh topology, a linear chain topology, a bus topology, a fully connected topology, a tree topology, etc. In other examples, the computing devices 204, 206 may directly communicate via the tethering object without requiring communications to pass through the computer server 202, as explained above.

The location-based digital content sharing features disclosed herein may be applicable to various different applications. For example, and as further explained below, the location-based digital content sharing features may be useful in computer-based gaming applications and/or other augmented reality applications. Although the following description explains the location-based digital content sharing features relative to a computer-based gaming application, it should be apparent that the features can be employed in various other suitable applications as explained further below.

Figure 3:
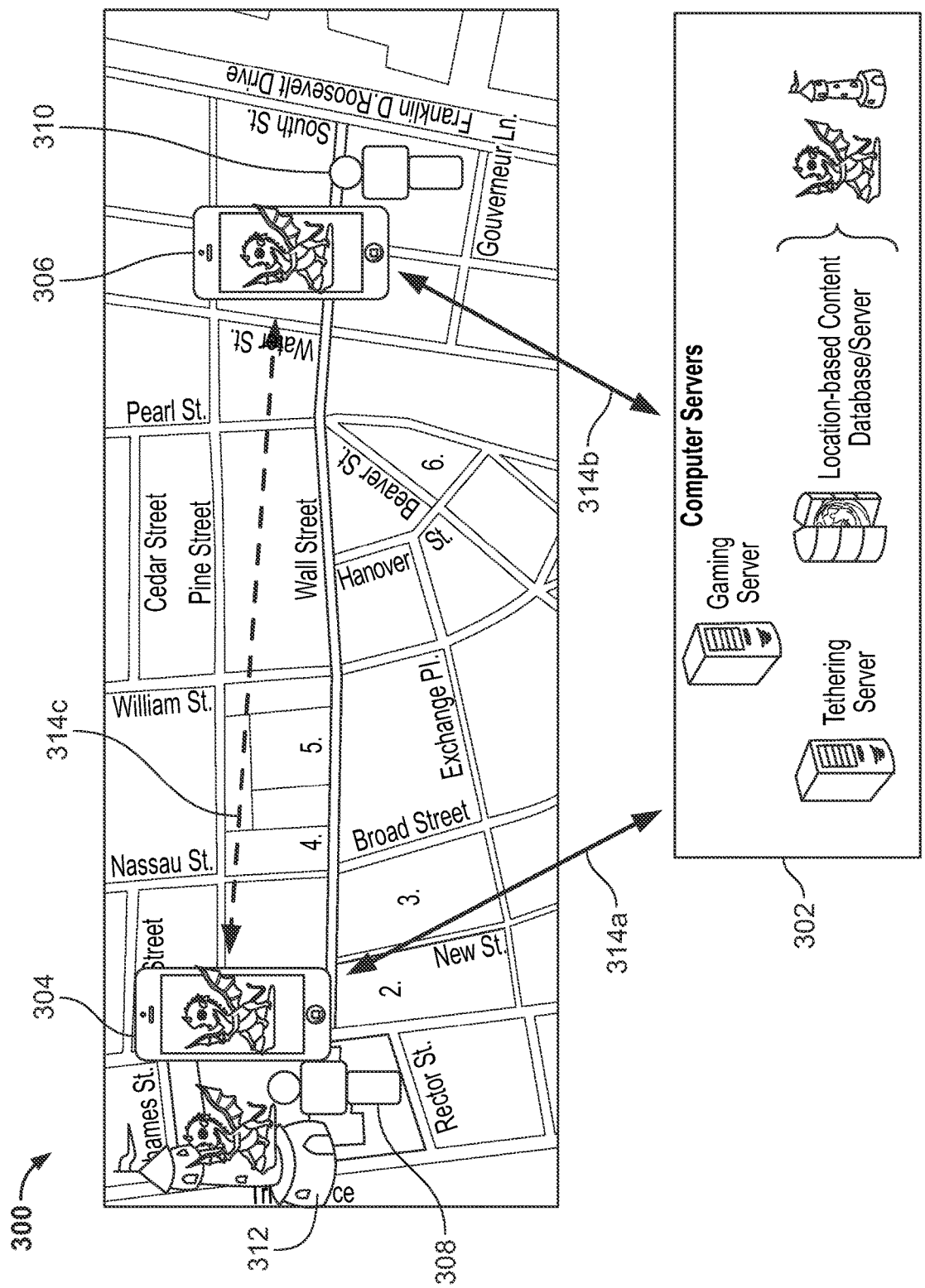
FIG. 3 is a diagram of a gaming system including a host computing device, a remote computing device, and computer servers for sharing location-based digital gaming content according to yet another example embodiment.

FIG. 3 illustrates a gaming system 300 including computer servers 302, a host computing device 304 (e.g., a smart phone) and a remote computing device 306 (e.g., another smart phone). The computer servers 302, the host computing device 304 and the remote computing device 306 may include similar features and perform similar functions as the computer server 202, the host computing device 204 and the remote computing device 206 of FIG. 2. The multiple devices (including the computer servers 302) are able to share location-based digital content through one or more tether objects, as explained herein. In the particular example of FIG. 3, the digital content is augmented reality (AR) content and/or gaming content, and is shown as a castle and a dragon (collectively referred to the digital content 312).

The computer servers 302 may manage the digital content 312. For example, and as shown in FIG. 3, the computer servers 302 may include a tethering server, a gaming server, a location-based content database/server, etc. In such examples, the tethering server manages the tethering object(s) between the computing devices (if employed), the gaming server hosts, manages, etc. the game, and the content database/server stores and/or manages the digital content 312. In the particular example of FIG. 3, the computing devices 304, 306 are communicatively coupled (e.g., via a communication network, etc.) with the computer servers 302, as shown by arrows 314a, 314b. The computer servers 302 can all be configured to run on one server for all services, or on multiple servers. Additionally, each of the computer servers (e.g., Gaming server, tethering server and locations-based content database/server) could comprise multiple computing devices. The servers can be at one location or at multiple locations, or even use one or both of the mobile devices as one or more of the servers or a hybrid configuration.

In the example of FIG. 3, the computer servers 302 may operate as a hub for communications between the computing devices 304, 306. In such examples, a variety of the tethering topologies may be employed as explained above. Alternatively, the computing devices 304, 306 may directly communicate via the tethering object's communication channel without requiring communications to pass through any one of the computer servers 302.

As shown in FIG. 3, the computing devices 304, 306 are mobile computing devices such as smart phones. In some examples, one or both computing devices 304, 306 may be another suitable mobile computing device such as a tablet, laptop, mobile gaming console, etc. In other examples, one or both computing devices 304, 306 may be a stationary computing device. For example, the remote computing device 306 may be a stationary desktop computing device located in a house.

In the example of FIG. 3, the digital content 312 is bound to a defined geographical area or location in the real world. In such examples, the host computing device 304 can only access the digital content 312 when its physical (real world) location in within the defined geographical area, and/or after optional authorization, authentication, etc. issues are resolved. For example, the defined geographical area may be a city square block as shown by the shaded portion in FIG. 3. In such examples, the digital content 312 (e.g., the dragon and the castle) are anchored in or otherwise bound to this geographical area.

As the host computing device 304 enters the geographical area, a game application on the host computing device 304 renders (e.g., presents, displays, etc.) the digital content 312 to a host player 308, as shown in FIG. 3. At this point, the host player 308 can engage the digital content 312 as desired. For example, the host player 308 may interact (e.g., via the game application) with the dragon, explore areas in and about the castle, etc.

In some examples, the game may require multiple players. For example, the game may require multiple collaborating players to overcome a game challenge, to interact with the digital content 312, etc. In such examples, a remote player 310 may join the engagement by relying on one more tethering objects, as explained herein. For example, the remote computing device 306 may receive an invite from the host computing device 304 and/or the computer servers 302 to join in a party, send a request to the host computing device 304 and/or the computer servers 302 to join in a party, etc.

Any one of the host computing device 304, the remote computing device 306, and/or the computer servers 302 may instantiate a tethering object that governs the behavior of how the computing devices 304, 306 engage with the location-based content. In the particular example of FIG. 3, the instantiated-tethering object is represented by a dashed line 314c. In such examples, one endpoint of the tethering object 314c is at the host computing device 304 and another endpoint of the tethering object 314c is at the remote computing device 304. As such, the tethering object 314c may be a direct connection between the computing devices 304, 306. In other examples, one or more tethering objects may be established between the computing devices 304, 306 and the tethering server of the computer servers 302. As such, the tethering objects may form an indirect connection between the computing devices 304, 306. In such examples, at least one of the endpoints of the tethering objects may be at the tethering server.

Once the tethering object 314c is instantiated, created, activated, etc., the remote computing device 306 may engage with the location-bound content 312. For example, the content database/server and/or the host computing device 304 may transmit the digital content 312 to the remote computing device 306 for rendering (e.g., presentation, displaying, etc.) to the remote player 310. In some embodiments, the remote player 310 passively participates by watching the host player 308 engage the digital content 312. This may be accomplished via a streaming service such as Twitch.TV and/or another suitable streaming service. In some examples, the streaming and/or the passive remote player 310 may alter behavior of the tethering object(s), the defined geographical area, etc.

Another option for the remote player 310 is to play the game as a regularly tethered player and stream the event on a media service such as twitch.tv. In turn the remote player 310 could allow other players from his or her streaming media audience to participate passively in the game by watching the on-going game play. The audience players could be allowed to alter the behavior of the tether, or even participate in the game actively through donations and/or commands that modify the tether in some way such as shape distance of the halo, etc. Further, the remote player 310 could invite friends or members of the audience to join the game by tether, or the remote player 310 could tether to the streaming players directly, allowing other players to be tethered to the remote player's location rather than directly to the host player 308. This approach permits a daisy chain of tethers, allowing more players to be tethered and allow a longer distance to be reach away from the host player 308. In example embodiments, the tether object comprises rules and/or setting to control these types of daisy chain tethers, and/or there may be monetary, in game currency, or life cost associated as well as other player/character requirements such as level and account type etc. As an example, the length or number of links in the daisy chain tether could be proportional to the number of audience member joining the tether. In order to mitigate abuse, the tether length can be adjusted such that more members are required to increase the length. Perhaps 10 members might be required to double the length of the tether, while an additional 100 members might be required to further double the length of the tether. Other variations are also possible, all of which are considered to fall within the scope of the disclosed and claimed subject matter.

In other embodiments, the remote player 310 actively engages with the digital content 312 along with the host player 308 (and other host players and/or remote players). In such examples, the gaming server and/or another server of the computer servers 302 may provide concurrent game content information to the host player 308, the remote player 310 and/or any other players actively (or passively) engaging with the digital content 312.

Although the example of FIG. 3 is described and illustrated as having only two players, it should be understood that the system 300 may be implemented with more than two players. For example, in some cases access to the location-based content 312 via the tethering object may be available to a party of game players such as three, six, nine, fifteen, twenty etc. players, where at least one of the players is the host player. In such cases, a single tethering object can comprise a commensurate number of endpoints to facilitate interactions among the player, or multiple tethering objects can be instantiated to facilitate interactions as desired. In view that tethering objects are associated with game content, it is contemplated that more preferred embodiments would employ a minimal number of tethers (e.g., one) to support the specific interactions with the location-based content.

As explained above, the digital content 312 may be bound to the defined geographical area in the real world. For example, the geographical area may be defined by a set of coordinates that form a geo-fenced area. In such examples, the content database and/or server may store content such as the digital content 312 based on location coordinates (e.g., a two-dimensional vector including a longitude coordinate value and a latitude coordinate value, etc.). In other examples, other location coordinates may be employed including, for example, a single coordinate value (e.g., a single-dimensional vector, etc.), three or more coordinate values. In some examples, the single coordinate value may be implemented with S2 geometry implementation that converts a sphere into a linear coordinate system using a Hilbert curve, and the three or more coordinate values may include a longitude coordinate value, a latitude coordinate value, an elevation coordinate value, an altitude coordinate value, a temporal value, a weather value, a temperature value, a terrain value or attribute, etc.

The tether object can be subject to interference from outside factors such as weather, temperature, season, traffic congestion (vehicle, network, people, etc.) or distance between host player and tethered player. The interference can be real or simulated, and/or destructive or constructive. For example, if there is a winter storm outside or if there are freezing temperatures, the tethering objects halo could be made larger by some factor for a Frost Mage or modify their abilities. At the same time, the weather's impact can negatively affect a Fire Mage. Another example for using tether interference to impact game play is to have destructive interference for the game and all players. For example, to adjust for various conditions and to motivate desired player behavior, context factors can destructively interfere with the tether object in enforce quarantines, reduce risk of a player being exposed to extreme weather, or other factors. For example, with respect to traffic flow, players could only be permitted to tether when they are outside a proximity range, such as more than two kilometers apart. This may help guarantee that the players will not be playing in close proximity.

In some examples, the digital content 312 may be bound by other factors other than the defined geographical area. For example, multiple host players in a game may create its own content (e.g., a dungeon, a castle, etc.) in the same physical location (e.g., at the Santa Monic Pier, Disneyland, etc.). Although all of the content from the host players is indexed by the same location-based coordinates, each host player's content may be differentiated by other factors to allow only specific players to access a particular host player's content. For example, these factors may include guild affiliations, player alignments, paid access, absolute time, relative time, passwords, etc. In such examples, the content database and/or server may utilize one or more indexing schemes for accessing particular content by using, for example, look-up tables, hash tables, lookup trees, and/or any other indexing schemes capable of differentiation non-coordinate information.

In some embodiments, more than one defined geographical area may be employed. For example, two or more non-overlapping or overlapping geo-fenced areas may be employed. Non-overlapping restrictions may provide an opportunity for monetizing geographical area because tethering becomes a commodity that can be bought and sold (e.g., owned, leased, rented, subscribed to, auctioned, etc.).

Additionally, the defined geographical area(s) may be restricted to absolute locations, which may be defined by physical boundaries, virtual boundaries, or other limits associated with one or more geographical areas. For example, the defined geographical area of FIG. 3 may be restricted to the same city square block no matter the movement of the host computing device 304. In such examples, as soon as the host player leaves the restricted absolute location and enter a new location, there would be a new restricted absolute location and the tether player may be immediately moved to the center of that restricted area or placed alongside the hosting player. In other examples, the defined geographical area may be a relative location based on, for example, the digital content 312, the host computing device 304, the number of players involved, the types of players involved, etc. For example, the remote computing device 306 may only have access to the digital content 312 when its virtual location and/or physical location is within the defined geographical area (e.g., a halo) around the host computing device 304. In such examples, when the host player 308 moves, the halo around the host computing device 304 defining accessibility to the digital content 312 may also move. The core (e.g., the centroid, etc.) of the halo may be the location associated with the host computing device 304. In other examples, the core of the halo may be may be determined by the number and/or distribution of other players that are physical local to the host computing device 304, the number and/or distribution of remote players as they virtually move about the halo space.

The halo around the host computing device 304 may have any suitable size, shape, etc. For example, the halo shape may be based on in-game effects (e.g., spells, devices, artifacts, fees, time, magic, etc.). In such examples, the halo may have a circular shape, or a non-circular shape such as a square shape, a triangle shape, a rhombus shape, a trapezoid shape, an arbitrary shape, etc. In some examples, the halo shape may be three-dimensional (e.g., a pyramid, a cube, a sphere, an ellipsoid, etc.). In other examples, the halo shape may be circular, or a shape made up of S2 cells specified by minimum cell levels, maximum cell levels and the maximum number of cells that can be used for the S2 cell representation of the halo shape centered on a location or based on the four closest cells of a specified level. The halo shape can be affected by map features such as but not limited to geographic features (e.g., hills, mountains, rivers, lakes, ponds, oceans, terrain gradient, etc.), man made features (e.g., buildings, bridges, overpasses, streets, pedestrian walk ways, etc.), and political features on the map (e.g., city, state, country boundaries, zip codes, etc.).

From another perspective, FIG. 3 can be considered as showing a bi-directional tether between the two players, where each player is tethered to the other. In such examples, the content from each location can be shared with the other location, and each player can be a host as well as the tethered player. This can be done with two tethers, or one bi-directional tether. It might or might not be desirable to share all the virtual content, and such content can be restricted so that only some of the content is shared based on, for example, an effect of the environment, such as weather, terrain, time of day, etc. It is contemplated that embodiments can employ many hybrid combinations to facilitate different games and/or applications.

Figure 4:
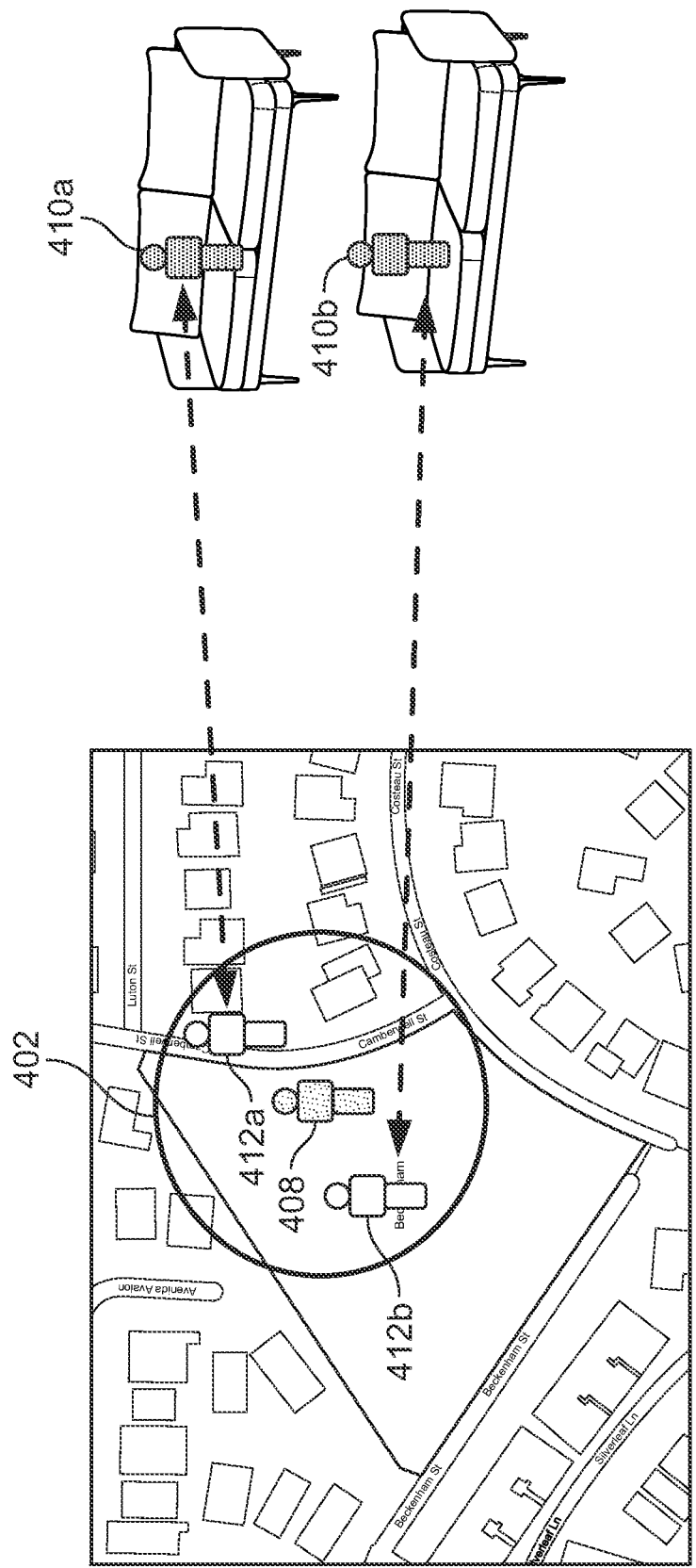
FIG. 4 is a diagram of a circular halo centered around a host computing device according to yet another example embodiment.

For example, FIG. 4 illustrates a halo 402 employable in the system of FIG. 3. In the particular example of FIG. 4, the halo 402 has a circular (e.g. bubble) shape centered around a host computing device (e.g., represented by a host player 408). As shown, two remote computing devices (e.g., represented by remote player 410a, 410b) are able to engage with location-based shareable content (e.g., the digital content 312 of FIG. 3) because their virtual locations (e.g., represented by virtual players 412a, 412b) are within the circular halo 402.

In the example of FIG. 4, the halo 402 may remain centered around the host player 408 even if the player 408 moves. In such examples, the remote players 410a, 410b may continue to engage the content so long as their corresponding virtual players 412a, 412b remain within the halo 402, and the tethering object remains intact. When the player 408 moves and the halo 402 moves with the player 408, the players 412a, 412b may reach the edge of the halo if they stand in one spot. In such examples, there can be a need to manage players reaching an edge of the halo. There are multiple ways of dealing with the tethered characters reaching the edge of the halo. For example, the characters can be forced to walk automatically, the characters can be pulled along the edge of the halo, the characters can be killed by the halo edge, the players could keep playing but their characters will start taking damage when outside the halo, they could be teleported next to the host player 408 instantly when they touch the edge of the halo, the halo could deform to some degree depending on the level of the tethered and hosting characters and once that halo deformation reaches its maximum degree of deformation it could start pulling the tethered characters along or they can start taking damage from leaving the halo, or other ways. These are just a few examples of what can happen at the edge of the halo, and there are many more possible combinations.

In some examples, all players may not see the same halo. Although both players 412a, 412b are tethered to the player 408, the halos that they are each respectively bound to could be of a different size or shape. This can be due to the level or each player's character or the class of character (e.g. a mage, a fighter, a berserker, a thief, etc.), or the type of account that the player has (e.g. paid, free, premium etc.). Other examples causing different halos include (but not limited to): a character possessing different items in the game that modify the halo (e.g., when a player has a "staff of reaching +30", for example, in the game, the character could be enabled to move 30 meters outside the regular halo without any ill effects), a new halo could be calculated taking into account all items and abilities for displaying, a player getting on a mount might extend the range that the character can be away from the host player 308, or the halo is simply scaled up by a factor that dependents on the mount's level or type.

Figure 5:
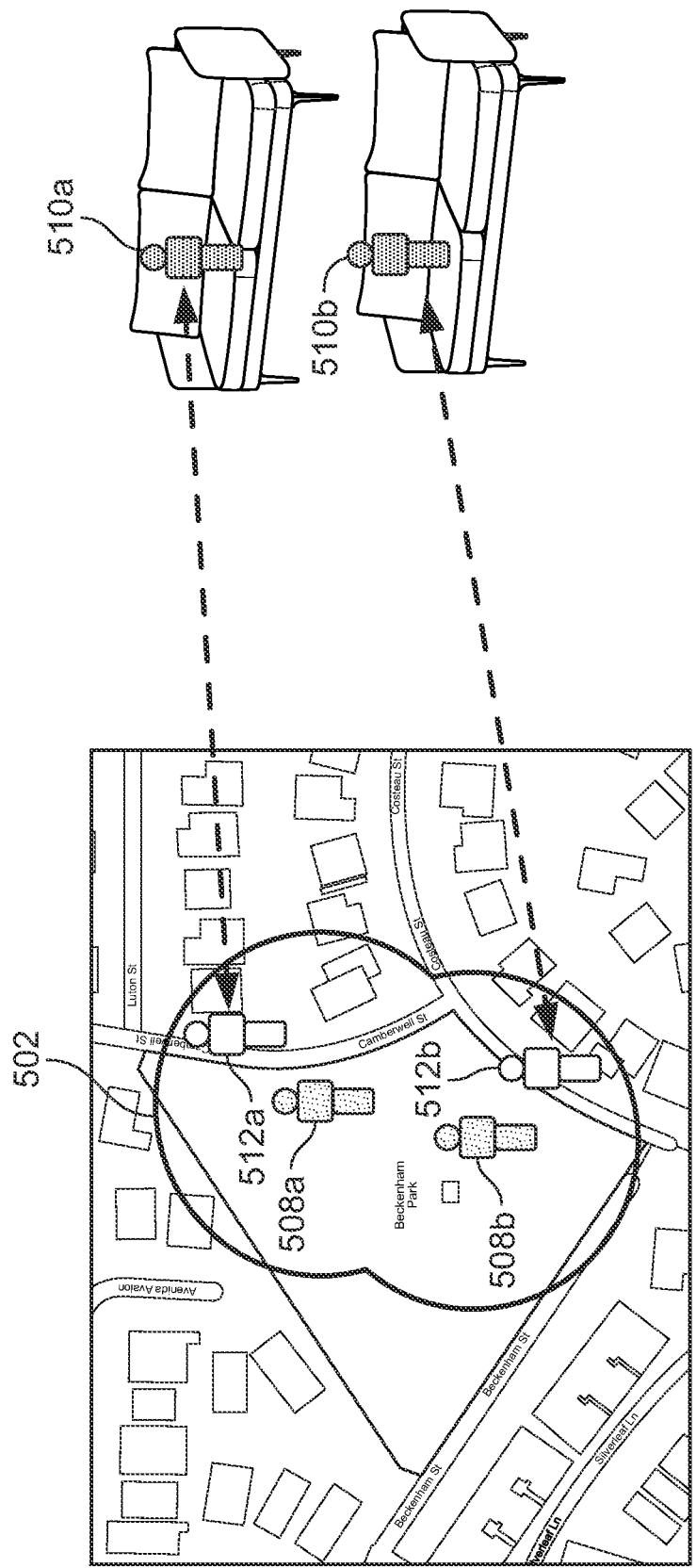
FIG. 5 is a diagram of a halo formed of two conjoined bubbles each centered on a different host computing device according to another example embodiment.

In other examples, halo parameters (e.g., shape, size, area, etc.) may depend on number of host players and/or remote players in a party. For example, FIG. 5 illustrates another halo 502 employable in the system of FIG. 3. In the particular example of FIG. 5, the halo 502 is a combination of two circular shapes (e.g. bubbles), where each circle is centered on a different local computing device (e.g., a different host computing device). As shown, two remote computing devices (e.g., represented by remote player 510a, 510b) are able to engage with location-based shareable content (e.g., the digital content 312 of FIG. 3) because their virtual locations (e.g., represented by virtual players 512a, 512b) are within the halo 502.

In the example of FIG. 5, one circle of the halo 502 may be centered on one host computing device (e.g., represented by a host player 508a), and the other circle of the halo 502 may be centered on the other host computing device (e.g., represented by a host player 508b). In other examples, one circle of the halo 502 may be centered on a host computing device (e.g., the host player 508a), and the other circle of the halo 502 may be centered on another computing device physically located at the geo-location (but not necessarily a host computing device). In such examples, the other computing device located at the geo-location may be locally tethering to the host computing device.

In other examples, the halo 502 may be a circle, a square, etc. centered among the host players.

Each circle (e.g., bubble) of the halo 502 may remain centered around its corresponding host player 508a, 508b (or another local player) even if the player 508a, 508b moves. Thus, the shape of halo 502 may evolve as the players move. In some examples, the halo 502 may split into two separate halos, each centered around its corresponding host player 508a, 508b (or another local player) as explained above relative to FIG. 4.

In the example of FIG. 5, a single tethering object may be shared among the host computing devices (host player 508a, 508b) and the remote computing devices (remote player 510a, 510b). In such examples, all of the computing devices may receive the same or portions of the same digital content (e.g., the digital content 312 of FIG. 3). In other examples, each remote player may also access more than one tethering object (e.g., from another host computing device) and have access to more than one halo.

Figure 6:
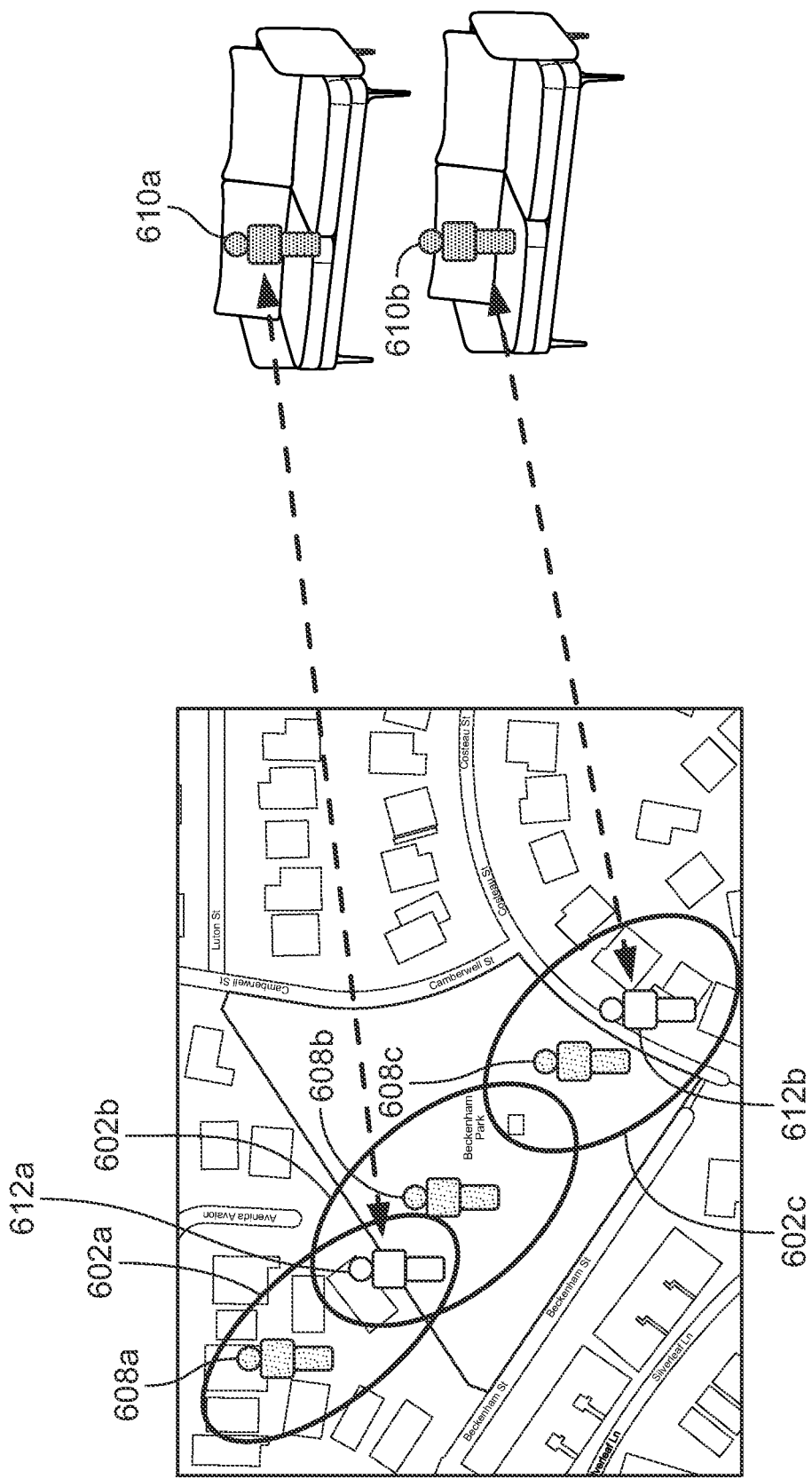
FIG. 6 is a diagram of three overlapping elliptical halos each extending around a different host computing device according to yet another example embodiment.

In some examples, distinct halos may be employed around different host computing devices. For example, FIG. 6 illustrates three elliptical halos 602a, 602b, 602c employable in the system of FIG. 3. In the example of FIG. 6, three host computing devices (e.g., represented by host players 608a, 608b, 608c) are located in the same geolocation and provide access to the three distinct halos 602a, 602b, 602. As shown, two remote computing devices (e.g., represented by remote player 610a, 610b) are represented virtually as virtual players 612a, 612b. The remote computing devices may engage with location-based shareable content bound to one of the halos if their corresponding virtual players 612a, 612b are within that halo. For example, the remote player 610a may engage with location-based shareable content bound to the halos 602a, 602b because its corresponding virtual player 612a is within the halos 602a, 602b.

In yet other examples, the halos 602a, 602b, 602c may form a chain of connected (e.g., overlapping) halos. In such examples, each remote player 610a, 610b may have access to content bound to all three areas defined by the three halos. In some examples, each remote player 610a, 610b may need to acquire permission to access the content bound to all three areas. Each remote player 610a, 610b may move virtually from one halo to another. In such examples, a computer server (e.g., the gaming server of FIG. 3) may hand off the moving remote player from one tethering object to another.

Figure 7:
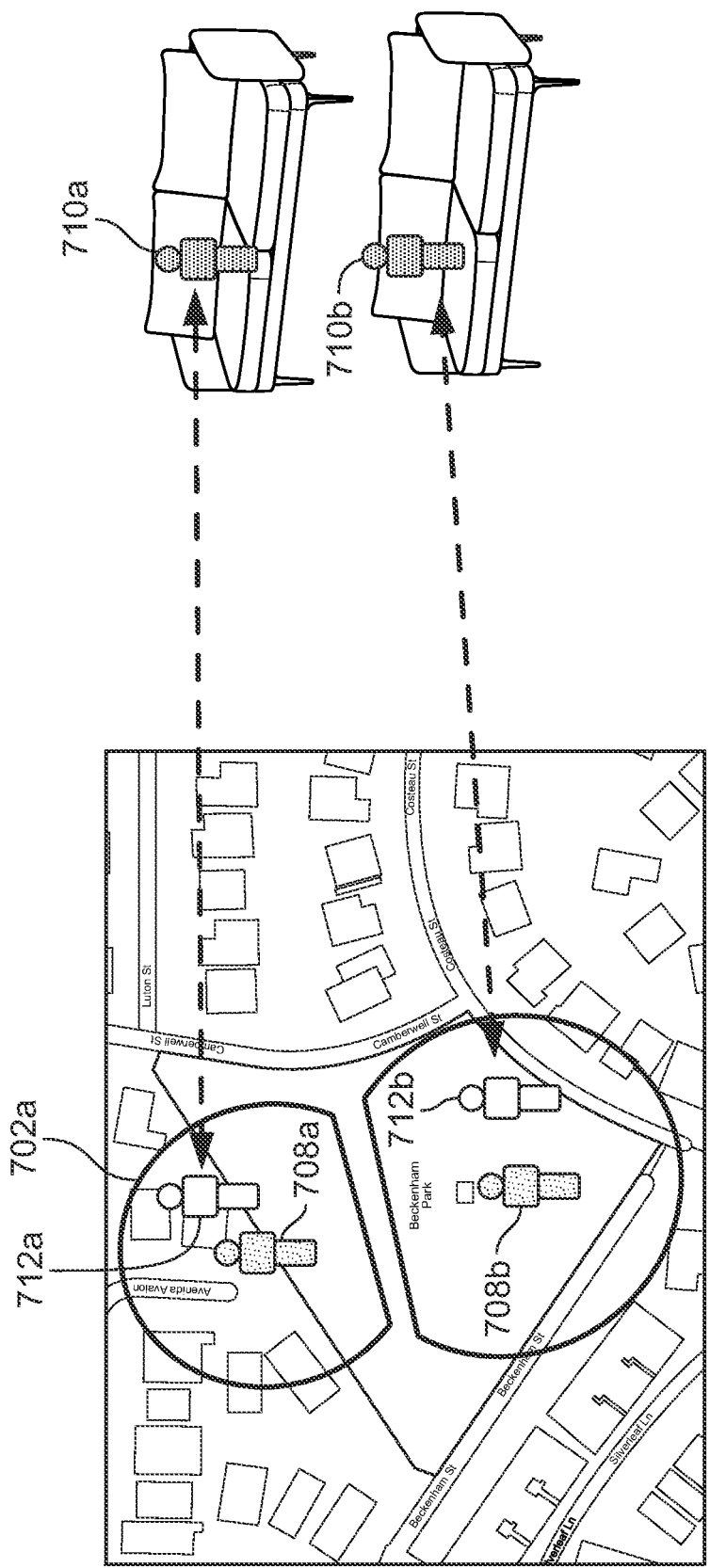
FIG. 7 is a diagram of two distinct non-overlapping halos corresponding to rival parties according to another example embodiment.

In some examples, distinct halos may be arranged not to overlap with each other. For example, FIG. 7 illustrates two distinct non-overlapping halos 702a, 702b employable in the system of FIG. 3. In the example of FIG. 7, the halos 702a, 70b extend about host computing devices represented by host players 708a, 708b, respectively. As shown, one remote computing device (e.g., represented by a remote player 710*a*) is able to engage with location-based shareable content bound to the halo 702*a* because its virtual location (e.g., represented by a virtual player 512*a*) is within the halo 702*a*, and another remote computing device (e.g., represented by a remote player 710*b*) is able to engage with location-based shareable content bound to the halo 702*b* because its virtual location (e.g., represented by a virtual player 512*b*) is within the halo 702*b*.

In the example of FIG. 7, two rival parties may be in the same area. For example, the host player 708*a* and the virtual remote player 712*a* may represent party A, and the host player 708*b* and the virtual remote player 712*b* may represent party B. In some examples, the tethering object from one party (e.g., party A) may interfere with the tethering object from the other party (e.g., party B). In such examples, the halos 702*a*, 702*b* may destructively interfere with each other such that the overlapping areas are removed from the halos 702*a*, 702*b*, cancel each other out, etc. as shown in FIG. 7. The tether can change what players can do in their respective halos when the halos get deformed to avoid overlapping. This might, for example disable looting or performing any other action other than battling with the rival party or retreating, until there is no longer a deformation from colliding halos from rival parties.

In the examples of FIGS. 4-7, the halos positioned around a local (e.g., a host) player may be considered a boundary that restricts virtual movement of remote players. As such, remote players may virtually move freely within one of the halos and still have access to the shared content, but may not be permitted to exceed the halo's boundary.

In some examples, the remote players may pay a cost (e.g., an in-game cost, a real-world cost, etc.) to virtually move further away from the host player, or to exceed the boundary of the halo. For example, a remote player's character might expend stamina points, health points, and/or other types of costs when they exceed a threshold distance associated with the halo around the host player. In such examples, the remote player's cost to virtually move further away from the host device could be a function of the relative distance between the two players. For examples, the cost (e.g., stamina points, etc.) may increase as the distance increases. In such examples, the costs may be 0 stamina points per second when the distance is between 0 and 50 meters, and 5 stamina points per second for every 10 meters outside the 50 meter distance (until the halo boundary is reached). In some cases where the remote player is permitted to exceed the halo's boundary, the cost may shift from points to money (e.g., $1.00 per minute for every 10 meters beyond the halo's boundary).

Although the above features are described with respect to a computer-based gaming and augmented reality application, it should be apparent that the features are not limited to game play and/or augmented reality. Rather, the features disclosed herein may be implemented in various other suitable applications that share location-based digital content. For example, the features may be implemented in educational applications where content may be shared among students, teachers, classes, schools, etc. In such examples, students may participate in virtual classrooms by raising their virtual hands, using virtual whiteboards, conducting group discussions, etc. In other examples, the features may be implemented in military applications where location-based content may be shared among members of the same or different military branches. In such examples, the defined geographical areas (e.g., halos) may be centered around battle areas, training grounds, etc. In still other examples, the features may be implemented in shopping applications, medical applications, real-estate applications, etc. For example, in medical applications, the defined geographical areas (e.g., halos) may be centered around various hospitals to allow the hospitals to share valuable digital content (e.g., data relating to inflected patients, deaths, etc.). In real-estate applications, one or more remote users (using a remote computing device) may view a home (e.g., a defined geographical area), take a virtual tour of the home guided by a real-estate agent at the home (e.g., using a host computing device within the defined geographical area), etc. via shared digital content.

The shareable digital content disclosed herein may include any suitable type of content. For example, the digital content may include different types of digital modalities such as one or more of the following modalities: audio, still images, video, kinesthetic, tactile, APIs, 2D content, 3D renderable content or models, text, metadata, etc. For example, the dragon shown in FIG. 3 may include a full 3D AR model that may be rendered on the host computing device 304 and/or the remote computing device 306 from different orientations, positions, locations, lighting conditions, scales, etc. In some examples, the digital content may include menus, menu items, dialog boxes, advertisements, software modules, AI modules (e.g., neural networks, SVMs, etc.), executable code, help files, forums, community portals, virtual stores, data, etc.

Any one of the computing devices disclosed herein may include one or more non-transitory computer readable memories for storing computer-readable instructions for performing one or more of the methods described above, and one or more processors for executing the computer-readable instructions. In such examples, the processor(s) may execute instructions which it accesses from a hard disk, a floppy disk, an optical disk, a flash drive, ROM, RAM, and/or or any other suitable medium for storing instructions.

Figure 9:
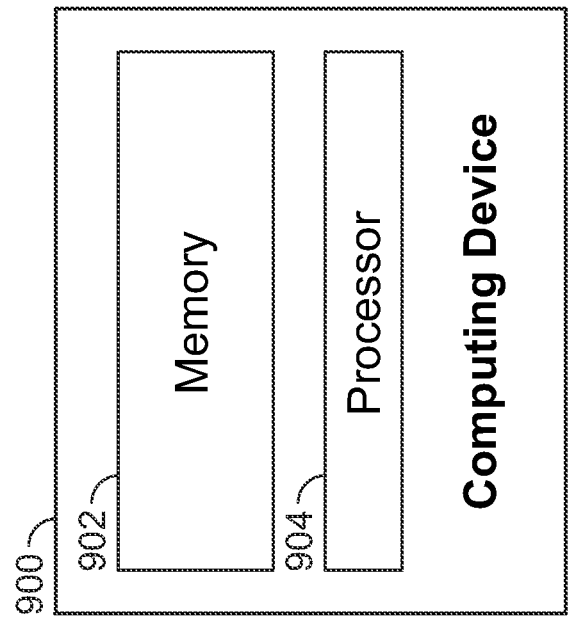
FIG. 9 is a block diagram of an example computing device according to another example embodiment.
Figure 8:
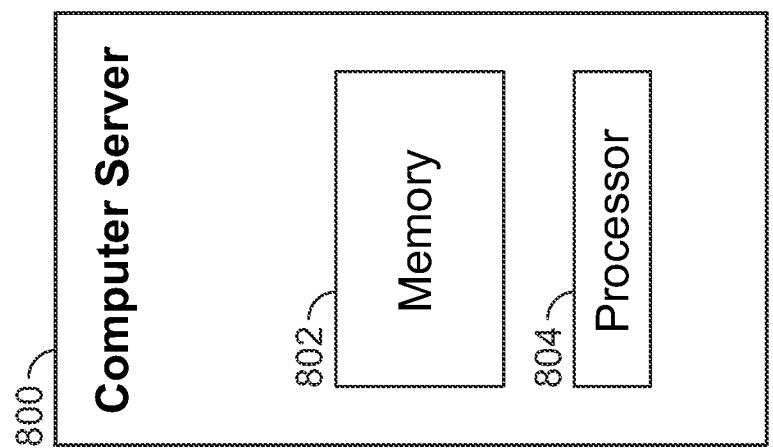
FIG. 8 is a block diagram of an example computer server according to yet another example embodiment.

For example, FIG. 8 illustrates a computer server 800 including a memory 802 for storing computer-readable instructions for performing one or more of the methods described above, and a processor 804 for executing the computer-readable instructions. Likewise, FIG. 9 illustrates a host or remote computing device 900 including a memory 902 for storing computer-readable instructions for performing one or more of the methods described above, and a processor 904 for executing the computer-readable instructions.

In some embodiments, the host computing device and/or the remote computing device may be a mobile or portable computing device (e.g., cell phone, smart phone, tablet, wearable device, AR/VR glasses or visors, hand-held game device, etc.). In some examples, the host computing device and/or the remote computing device may be a computing device installed and/or removably placed in a vehicle (e.g., a car, a golf cart, a drone, a truck, a plane, a boat, etc.). In other examples, the host computing device and/or the remote computing device may be a stationary computing device such as a desktop computer, a gaming console (e.g., Xbox, PS4, Wii, etc.), a set top box, an appliance, a television, etc.

Additionally, the host computing device and/or the remote computing device may have one or more software instructions that provide game play functionality and/or other game related facilities. Further, the gaming software instructions may provide symmetric game play (e.g., both devices have the same game play functionality) or asymmetric game play (e.g., the devices have differing game play functionality).

The host computing device and the remote computing device may be positioned remote from each other. For example, the remote computing device and the host computing device may be physically located in the same city (e.g., down the street, across the city, etc.), in neighboring cities, in neighboring countries, in different countries on opposite sides of the world, etc. For instance, the host computing device may be in the United States, and the remote computing device may be in Australia.

Further, and as explained herein, the physical location of any one of the computing devices may be determined based on one or more sensors. In such examples, the sensors may be a part of (e.g., onboard) the computing device and/or external to the computing device. For example, onboard sensors may include cameras, accelerometers, magnetometers, GPS chips and/or other suitable sensor that can provide or generate a digital representation of the physical location of the computing device. In such examples, the information from the sensor (e.g., a camera) may be used to recognize features in the environment, and/or identify a particular location. External sensors may include cameras, recognition sensors (e.g., facial, device, etc. recognition devices), infrared detectors, etc. Locations of the computing devices may be determined using wireless triangulation, GPS, inertial measurements, simultaneous location and mapping (SLAM), vSLAM, and/or other suitable techniques.

The defined geographic areas disclosed herein may be suitable shape, size, configuration, etc. as explained above. The defined geographic areas may be an absolute (e.g., a fixed) geographical area, a relative geographical area (e.g., a halo) centered and movable based on a computing device, and/or transition between an absolute geographical area and a relative geographical area when desired. In some examples, the geographic areas may be defined based on content proximity criteria that depends on at least the computing device's physical location and the content's physical location.

The communication networks disclosed herein may include an internet/intranet wireless network, a cellular (e.g., 4G, 5G, etc.) network connection, and/or another suitable network. In some examples, the internet/intranet network may include a Wi-Fi connection, a Bluetooth connection or any other suitable wireless connection. These networks can be used for obtaining the players location or approximate location via triangulation when other sensors are not available or are not functioning reliably. For example, when the player is in a mall, at a conference, etc. and there is no reliable GPS signal, these and other networks can be used for getting a players' location or a rough estimation of their location using wireless triangulation.

As explained above, the tethering objects disclosed herein may include endpoints. In some examples, the endpoints may be positioned at different computing devices. For example, the endpoints may include one or more networking communication sockets that leverage TCP/IP and/or UDP/IP based communications. However, it should be appreciated that other protocols and/or networking connections (e.g., Wi-Fi, Bluetooth, 802.11, cellular, satellite, HTTP, etc.) may be used as well.

In some examples, it may be desirable to provision and/or otherwise configure the networking infrastructure (e.g., cellular tower sites, 5G sites, 4G sites, network switches, network routers, optic fiber connections, network fabrics, etc.) for the system. In such embodiments, one or more tethering objects may be created that extend into the networking infrastructure. For example, a host computing device may be connected to the network via a 5G cell site that can then provision a cut-through route among network switches of networking fabric to a remote computing device. Additionally, in some examples, the tethering objects may include provisioned or dedicated channels (e.g., specific optic fiber wavelengths, TDMA, etc.) among the computing devices. Such an approach may be advantageous because it ensures lower latency among connected devices.

Additionally, any one of the tethering objects may be anchored via a "stake in the ground." For example, the stake may be a virtual game object used to cache content for a particular location (e.g., from a previous game experience), a craftable object, a purchased object, a created object, etc. Further, any one of the tethering objects may include a virtual portal to a location once visited. In such examples, the players may portal, via a portal stone, to an area they have visited at, for example, a reduced cost. In other examples, a user could attach the tether to a bus or another vehicle and the remote players would have to play following that vehicle, a user could select a predefined route and have the tether travel the route at a set speed, etc. The routes could be (but not limited to) a bus route, a nature trail, a route of a race, etc.

Further, management of the tethering objects may be beneficial. For example, multiple tethering objects in a system may be optimized for latency, the number of players involved, etc. In some examples, the tethering objects may be managed by providing queues for players (e.g., a first-in-first-out queue, etc.). In other examples, user interfaces, configurations, etc. for the tethering process may assist managing the tethering objects.

The following are some possible high-level definitions and implementation in pseudo code that illustrates possible tethering object definitions, and some of the tether calculations:

```
0   def HostTether( ){      # Host specific tether class on host device
1       HostEndpointSocket;         # TCP/IP; UDP/IP; socket to server and/or remote player
2       RemotePlayerList[ ];        # List of remote players in group
3       Halo halo;                  # halo boundary as host sees
4       def HaloRules( );               # Rules governing functions of halo
5       Location location( );       # Location of the hosting player in the world
6       def CreateTether( );        # Create a tether on host
7       def DestroyTether( );       # Destroy a tether on host
9       def MessageTether( );       # Send message to players on tether
9       def AuthorizePlayer( );         # Allow remote player to join
10      etc.
11  }
12
13  def RemoteTether( ){    # Remote tether class on remote device
14      RemoteEndpointSocket;           # TCP/IP; UDP/IP; socket to server
15      HostPlayerList[ ];      # List of host players in group
```

-continued

```
16    Halo halo;                      # halo boundary as remote player sees
17    Location location( );           # Location of the tethered player in the world
18    def CreateTether( );            # Create a tether on host
19    def DestroyTether( );           # Destroy a tether on host
20    def MessageTether( );           # Send message to players on tether
21    etc.
22  }
23
24  def ServerTether( ){              # Tether on tether server
25    RemoteEndpointSocket;           # TCP/IP; UDP/IP; socket to remote
26    HostEndpointSocket;             # TCP/IP; UDP/IP; socket to host
27    HostPlayerList[ ];              # List of host players in group
28    TetherLoction[ ];               # List or geolocation boundary
29    def HaloRules( );               # Functions governing halos
30    def CreateTether( );            # Create a tether on host
31    def DestroyTether( );           # Destroy a tether on host
32    def MessageTether( );           # Send message to players on tether
33    etc.
34  }
35
36  def Character( ){                 # Character information
37    int level;                      # Character level determines base abilities
38    int health;                     # Hit points with modifiers
39    int baseHealth;                 # Hit points without any modifiers
40    Type characterClass;            # Class of character (mage, thief, warrior, ranger, ...
41    HostTether hTether;             # Host tether object/location of hosting player
42    RemoteTether rTether;           # Remote tether object/location of tethering character
43    ServerTether sTether;           # Link to server tether object (0 if not set)
44    Area tetherlArea;               # Info tether character location, including maps...
45    Area hostArea;                  # Info host character location, including maps ...
46    Item items[ ];                  # List of equipped items
47    Mount mounts[ ];                # List of mounts that character has
48    int mount;                      # Current mount or −1 if not riding a mount
49    Items inventory[ ];             # All items that the character posses
50    float base;                     # Base tether reach distance
51    etc.                            # Other information that may or is needed
52  }
53
54  def Mount( ){                     # Mount for character and NPC information
55    Item items[ ];                  # Items equipped on the mount
56    int level;                      # Level of the mount
57    Type type;                      # Type of mount (horse, Pegasus, dragon, ...
58    int health;                     # Hit points with modifiers
59    int baseHealth;                 # Hit points without any modifiers
60    etc.
61  }
62
63  def Item( ){    # Items information & modifiers
64    Modifiers modifiers[ ];         # List of modifiers for items
65    Type type;                      # Type of item (wearable, weapon, ...
66    int count;                      # How many of that item
67    etc.                            # Many other specifications that are needed
68  }
69
70  def Area( ){    # Area information such as weather terrain
71    Type weather;                   # Current weather (temp, wind, rain, season, ...
72    Type terrain;                   # Type of terrain (desert, mountain, swamp, ...
73    Map maps[ ];                    # Maps to use for area (political, terrain, ...
74    Time lTime;                     # Localtime of the location
75    etc.            # Other information that will be needed for the above
76  }
77
78  def CharacterHalo( ){             # Character halo effects on tether
79    Character pCharacter;           # Info for character items, mount, ...
80    Area tetherlArea;               # Info tether character location
81    Area hostArea;                  # Info host character location
82    Halo halo;                      # List or geolocation boundary (shape of the halo)
83    float range;                    # Range for calculating the halo
84    Tether hostTether( );           # Tether to host
85    Tether remoteTether( );         # Tether to remote
86    Tether serverTether( );         # Tether to server
87    etc.            # Other information that will be needed for the above
88  }
89
90  def NPC( ){    # Non-player Character
91    int level;                      # Character level determines base abilities
92    int health;                     # Hit points with modifiers
```

-continued

```
 93     int baseHealth;                    # Hit points without any modifiers
 94     Type characterClass;               # Class of character (mage, thief, warrior, ranger, ...
 95     Area area type;                    # Info tether character location
 96     Location anchor;                   # Info host character location
 97     Item items[ ];                     # List of equipped items
 98     Mount mount;                       # List of mounts that character has
 99     Items inventory[ ];                # All items that the character that can be dropped
100     float base;                        # Tether reach max distance for tether
101     etc.
102 }
103
104 def Halo( ){      # Halo definitions and information
105     Shape shape;           # shape of the halo list of coordinate or other method
106     float range;                       # calculated for a character's range
107     float interference;                # interference factor for the halo based on tether
108     etc.
109 }
110
111 float Character:tReach( ){# Calculated reach of tether for a specific character/location
112     float reach;         # calculated value to determine if the character can reach
113                          # the host location to play as a tether player
114     #Calculated the local modifiers for the character's physical location
115     float localModifiers = modifiers(
116        level,                          # Level of the character
117        items[ ],                       # Modifiers from items equipped
118        mounts[mount],                    # Modifiers from mount
119        genre,                          # Modifiers from char genre (mage, thief, ...
120        tetherArea,                     # Weather & terrain modifiers
121        etc.);                          # Other info that maybe desired for a game
122     # Calculated the remote modifiers for the character's remote host location
123     float remoteModifiers = modifiers(
124        level,                          # Level of the character
125        items[ ],                       # Modifiers from items equipped
126        mounts[mount],                    # Modifiers from mount
127        genre,                          # Modifiers from char genre (mage, thief, ...
128        hostArea,                       # Events, restriction, weather & terrain modifiers
129        etc.);                          # Other info that maybe desired for a game
130     float tetherModifiers = modifiers(
131        items[ ],                       # Modifiers from items equipped
132        mounts[mount],                    # Modifiers from mount
133        hostTether,                     # Uses info from host tether
134        remoteTether,                   # Uses info from remote tether
135        serverTether,                   # Uses info from server tether
136        playerAccount;                      # Player account type paid/free paid my require higher
137                                        # service or using dedicated servers
138        etc.);                          # Other info that maybe desired for a game
139     reach = base * localModifiers * remoteModifiers * tetherModifiers; # base
140                                        # distance for any character to travel
141     return reach; # max                reach based on two location
142 }
143
144 Halo Character:halo( ){               # Calculate shape and size of a halo for a character/location
145     Halo fHalo;                        # Final halo shape and size to be returned for the request
146     float range;                       # this is the range for character or character and mount
147     range = Range(                        # calculates the range of character
148        mounts[mount],                  # needed to get mount info
149        hostArea.weather,               # needed weather modifiers
150        hostArea.terrain,               # type of terrain
151        items,                          # needed for item modifiers
152        hostTether,                     # host tether information
153        etc.);                          # other depending on game
154     if (mount and mounts[mount] is flying)     # Check if the mount & flying
155        fHalo = circle(range, hostTether.location);      # creates circular halo
156                                                         # centered on the host
157     }
158     else{ # Other change can be added to support collisions of halos ect.
159        fHalo = footHalo( ){ # calculates a range for character without flight
160           mounts[ ],                           # needed to get mount info
161           hostArea.weather,                    # needed weather modifiers
162           items,                               # needed for item modifiers
163           hostTether,                          # host tether information
164           etc.);                               # other depending on game
165        }
```

```
166    fHalo.interference = haloInterference( ){ # calculates interference for halo
167       mounts[ ],                              # needed to get mount info
168       hostArea.weather,                       # needed weather modifiers
169       items,                                  # needed for item modifiers
170       hostTether,                             # uses info from host tether
171       remoteTether,                           # uses info from remote tether
172       serverTether,                           # uses info from server tether
173       etc.);                                  # other depending on game
174    fHalo.range = range; #set the range for the halo
175    return fHalo;
176 }
177
178 List getContent(Halo halo, Location location){   # gets all the NPS, Items a specific
179                                                  # Halo Location
180    List contentList( );                          # new empty content list
181    # get content from server and save to list
182    contentList.add(getNPCsFromServer(halo, location));   # retrieves NPC
183    contentList.add(getItemsFromServer(halo, location));  # retrieves items
184    return contentList;
185 }
```

The sample pseudo code implementation above shows possible definitions of some of the objects, functions and how they work. The function "float CharactentReach( )" on line 111 uses the character information, players current location, host tether location, players account, and server tether information for calculating how far the reach can be for that character at that time. The local, remote, and server tether modifiers all influence the max distance that a player can reach when tethering to a remote location. The tethers can affect the reach both negatively and/or positively. For example, the system can decide that a player's local connection is inadequate for the game and give an extra low score or even a zero preventing the user from tethering. Another factor that can play a role is whether the tethering player is in an area with a stay at home order (e.g., possible orders hurricane, pandemic, blizzard, etc.). In such examples, the system can give the tethering player a higher score to encourage tethering and not going outside to play the game. Similar logic can be applied to the hosting player if the hosting player is in an area with a stay at home order. For example, the hosting player could receive a score of zero preventing anyone from tethering to the player. A positive score may be given to the hosting player for some of the following reasons: no stay at home order, an event is happening at that location and the game is encouraging people to join the event, low congestion on the network in the area compared to other areas, encouraging players to join this location, allowing more congested location to be relieved. These are just a few factors that can be used to effect the reach of a player trying to tether to a host.

The function "Halo Charactenhalo( )" on line 144 calculates the size and shape of the halo using the character and tether information. The shape of the halo can be determined by character attributes, such as if they have a mount, if they can fly, etc. If the player is able to fly, the system can define the halo as a circle, and center the halo on the player. In such examples, the size of the halo can be determined by the speed of the player's speed or their mount speed. The host tether can affect the shape and size of the halo for the remote player ensuring that if the hosting player is also a hotspot for other players, they can be all within the same range of the hosting player. When the host player's area has dead zones (e.g., zones where no network service or services are available such that if the hosting player would go there all other players would lose their connection to the hosting player and be dropped from the game), there could be a desire for the hosting player to stay where there is acceptable connectivity data coverage for the player. Further, if the players are members of a party and have to stay together it could be advantageous to direct the tethered players to areas with good data coverage. When the hosting player has a limited internet connection or is being throttled because they have reached their data limit, it might be desirable to make the halo smaller to limit the amount of information that has to be sent to the hosting player. Such an approach provides advantageous technical impacts by limiting content that must be sent over a network. Many of the same limitations can be applied to a remote player such as if the user's internet connection is slow, the size of the halo may be limited to make sure all NPC and items can be displayed that the "List getContent(Halo halo, Location location)" line 178 function returns. All these tether limitations make sure the game or other experiences can be enjoyable for the participants and that there is not lag or other negative experiences.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for sharing digital content, the system comprising:
   one or more computer digital content servers;
   a first computing device in communication with the one or more computer digital content servers; and
   a second computing device in communication with the first computing device and/or the one or more computer digital content servers, the second computing device remote from the first computing device, wherein the one or more computer digital content servers are configured to provide access of shareable digital content to the first computing device, wherein the shareable digital content includes augmented reality content bound to a first halo that moves and remains centered on the first computing device as the first computing device moves and that dynamically changes shape and/or size in real time based on geographic features including hills, mountains, rivers, lakes, ponds, oceans, terrain gradients, buildings, bridges, overpasses, streets, and pedestrian walks ways and based on a second halo associated with a third computing device to prevent overlapping with the second halo associated with the third computing device, and wherein the first computing device and the second computing device are each configured to display a map including the first halo, wherein the first computing device, the second computing device, and/or the one or more computer digital content servers are configured to instantiate a tethering object associated with the shareable digital content, the tethering object including a first endpoint at the first computing device and a second endpoint at the second computing device, wherein the second computing device is associated with a user having a virtual presence movable into and out of the first halo and wherein the second computing device is configured to receive the augmented reality content, via the tethering object, at the second endpoint when the second computing device is physically located outside the first halo, and only if the movable virtual presence of the user of the second computing device enters and remains within the first halo.

2. The system of claim 1, wherein the first computing device is configured to receive the augmented reality content, and transmit the augmented reality content, via the tethering object, to the second endpoint.

3. The system of claim 1, wherein the one or more computer digital content servers includes a first computer digital content server configured to transmit the augmented reality content, via the tethering object, to the second endpoint.

4. The system of claim 1, wherein the first computing device includes a non-transitory computer readable memory, and wherein the first computing device is configured to instantiate the tethering object stored in the non-transitory computer readable memory.

5. The system of claim 1, wherein the second computing device includes a non-transitory computer readable memory, and wherein the second computing device is configured to instantiate the tethering object stored in the non-transitory computer readable memory.

6. The system of claim 1, wherein the one or more computer digital content servers includes a first computer digital content server having a non-transitory computer readable memory, and wherein said first computer digital content server is configured to instantiate the tethering object stored in the non-transitory computer readable memory.

7. The system of claim 1, wherein the first computing device is configured to send a tethering request to the second computing device, and/or the second computing device is configured to send a tethering request to the first computing device.

8. The system of claim 1, further comprising a plurality of host computing devices, wherein the plurality of host computing devices includes the first computing device, wherein the tethering object is a first tethering object and the shareable digital content is first shareable digital content, and wherein the second computing device is configured to receive at least a portion of second shareable digital content via a second tethering object including an endpoint at another one of the plurality of host computing devices.

9. The system of claim 1, further comprising a plurality of remote computing devices, wherein the plurality of remote computing devices includes the second computing device, wherein the tethering object includes a third endpoint at another one of the plurality of remote computing devices, and wherein said another one of the plurality of remote computing devices is configured to receive at least a portion of the shareable digital content, via the tethering object, at the third endpoint.

10. A computer-implemented method executed by one or more computer digital content servers for sharing digital content, the method comprising:

providing access of shareable digital content to a first computing device, wherein the shareable digital content includes augmented reality content bound to a first halo that moves and remains centered on the first computing device as the first computing device moves and that dynamically changes shape and/or size in real time based on geographic features including hills, mountains, rivers, lakes, ponds, oceans, terrain gradients, buildings, bridges, overpasses, streets, and pedestrian walks ways and based on a second halo associated with a third computing device to prevent overlapping with the second halo associated with the third computing device, wherein a second computing device is associated with a user having a virtual presence movable into and out of the first halo, and wherein the first computing device and the second computing device are each configured to display a map including the first halo;

instantiating a tethering object associated with the shareable digital content, the tethering object including at least a first endpoint at the first computing device and a second endpoint at the second computing device remote from the first computing device; and providing access of the augmented reality content, via the tethering object, to the second endpoint at the second computing device when the second computing device is physically located outside the first halo, and only if the movable virtual presence of the user of the second computing device enters and remains within the first halo, wherein the second computing device is remote from the first computing device.

11. The method of claim 10, wherein providing access of the augmented reality content includes transmitting the augmented reality content, via the tethering object, to the second endpoint.

12. The method of claim 10, wherein the augmented reality content is stored on the second computing device, and wherein providing access of the augmented reality content includes providing access of the augmented reality content stored on the second computing device.

13. The method of claim 10, wherein the one or more computer digital content servers includes a first computer digital content server having a non-transitory computer readable memory, and wherein instantiating the tethering object includes instantiating the tethering object stored in the non-transitory computer readable memory.

14. The method of claim 10, wherein the first computing device is a host computing device, the tethering object is a first tethering object and the shareable digital content is first shareable digital content, and wherein the method further comprises providing access of at least a portion of second shareable digital content via a second tethering object including an endpoint at another host computing device.

15. The method of claim 10, wherein the tethering object includes a third endpoint at a third computing device remote from the first computing device, and wherein the method further comprises providing access of at least a portion of the shareable digital content, via the tethering object, to the third endpoint.

16. A non-transitory computer readable medium including computer-executable instructions, where the computer-executable instructions are executable by a processor to:

provide access of shareable digital content to a first computing device, wherein the shareable digital content includes augmented reality content bound to a first halo that moves and remains centered on the first computing device as the first computing device moves and that dynamically changes shape and/or size in real time based on geographic features including hills, mountains, rivers, lakes, ponds, oceans, terrain gradients, buildings, bridges, overpasses, streets, and pedestrian walks ways and based on a second halo associated with a third computing device to prevent overlapping with the second halo associated with the third computing device, wherein a second computing device is associated with a user having a virtual presence movable into and out of the first halo, and wherein the first computing device and the second computing device are each configured to display a map including the first halo;

instantiate a tethering object associated with the shareable digital content, the tethering object including at least a first endpoint at the first computing device and a second endpoint at the second computing device remote from the first computing device; and provide access of the augmented reality content, via the tethering object, to the second endpoint at the second computing device when the second computing device is physically located outside the first halo, and only if the movable virtual presence of the user of the second computing device enters and remains within the first halo, wherein the second computing device is remote from the first computing device.

* * * * *